United States Patent
Song et al.

(10) Patent No.: US 10,701,454 B2
(45) Date of Patent: Jun. 30, 2020

(54) IMAGE PROVIDING SERVICE

(71) Applicant: Home Box Office, Inc., New York, NY (US)

(72) Inventors: Jack Song, Shoreline, WA (US); Xinkai Wang, Bellevue, WA (US); Gregory John Bellingham, Seattle, WA (US); Sata Busayarat, Seattle, WA (US); Brandon C. Furtwangler, Issaquah, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 15/196,499

(22) Filed: Jun. 29, 2016

(65) Prior Publication Data

US 2017/0006349 A1    Jan. 5, 2017

Related U.S. Application Data

(60) Provisional application No. 62/240,888, filed on Oct. 13, 2015, provisional application No. 62/187,135, filed on Jun. 30, 2015.

(51) Int. Cl.
| | | |
|---|---|---|
| G06F 16/958 | (2019.01) | |
| G02B 21/36 | (2006.01) | |
| G06Q 30/02 | (2012.01) | |
| H04N 21/61 | (2011.01) | |
| H04N 21/6379 | (2011.01) | |
| H04N 21/2183 | (2011.01) | |

(Continued)

(52) U.S. Cl.
CPC ......... *H04N 21/6125* (2013.01); *G06F 16/51* (2019.01); *G06T 11/60* (2013.01); *H04N 21/2183* (2013.01); *H04N 21/234363* (2013.01); *H04N 21/4858* (2013.01); *H04N 21/6379* (2013.01); *H04N 21/64322* (2013.01); *H04N 21/6581* (2013.01); *H04N 21/8153* (2013.01)

(58) Field of Classification Search
None
See application file for complete search history.

(56) References Cited

U.S. PATENT DOCUMENTS

| | | | | |
|---|---|---|---|---|
| 9,684,655 B2* | 6/2017 | Frank | ................ | G06F 17/30038 |
| 2001/0039567 A1* | 11/2001 | Baker | ............... | G06F 17/30902 |
| | | | | 709/203 |

(Continued)

*Primary Examiner* — Nasser M Goodarzi
*Assistant Examiner* — Terrika Peterson
(74) *Attorney, Agent, or Firm* — Amin, Turocy & Watson, LLP

(57) ABSTRACT

The described technology is directed towards an image providing service, including an image processing service that composites a base image into a resultant image, e.g., by resizing an image, overlaying text and so forth based upon a purpose for that image and/or a client device class; other parameters such as design information, protection and so forth also may be specified. When a client requests an image including by specifying a purpose and size in a request to an endpoint (e.g., URL) for an image, the image processing service locates or composites a resultant image corresponding to the request, and returns the resultant image or a modified (e.g., resized) resultant image in response to the request. Clients thus obtain images based upon a desired purpose without having to do client-side image processing including image compositing.

20 Claims, 12 Drawing Sheets

(51) Int. Cl.
*H04N 21/485* (2011.01)
*G06T 11/60* (2006.01)
*H04N 21/643* (2011.01)
*H04N 21/658* (2011.01)
*H04N 21/2343* (2011.01)
*H04N 21/81* (2011.01)
*G06F 16/51* (2019.01)
*H04N 1/00* (2006.01)

(56) References Cited

U.S. PATENT DOCUMENTS

| | | | | |
|---|---|---|---|---|
| 2002/0087573 A1* | 7/2002 | Reuning | | G06Q 10/06 |
| 2005/0021625 A1* | 1/2005 | Fujimura | | H04N 7/147 |
| | | | | 709/204 |
| 2007/0146798 A1* | 6/2007 | Eto | | H04N 1/00132 |
| | | | | 358/302 |
| 2007/0250511 A1* | 10/2007 | Endler | | G06F 17/30864 |
| 2009/0051962 A1* | 2/2009 | Asai | | G06F 3/1205 |
| | | | | 358/1.15 |
| 2011/0181911 A1* | 7/2011 | Kojima | | G06T 11/60 |
| | | | | 358/1.15 |
| 2012/0127198 A1* | 5/2012 | Gundavarapu | | G09G 5/026 |
| | | | | 345/629 |
| 2012/0191548 A1* | 7/2012 | Des Jardins | | G06Q 30/0241 |
| | | | | 705/14.68 |
| 2013/0132422 A1* | 5/2013 | Rogish | | G06F 16/958 |
| | | | | 707/769 |
| 2013/0212211 A1* | 8/2013 | Maigatter | | G06T 11/60 |
| | | | | 709/217 |
| 2014/0237022 A1* | 8/2014 | Harvey | | G06F 17/30899 |
| | | | | 709/203 |
| 2014/0307112 A1* | 10/2014 | Sokeila | | H04N 5/23267 |
| | | | | 348/208.6 |
| 2015/0170336 A1* | 6/2015 | Lapointe | | G06T 3/403 |
| | | | | 382/298 |
| 2015/0310652 A1* | 10/2015 | Dobson | | G02B 21/365 |
| | | | | 345/629 |
| 2016/0267674 A1* | 9/2016 | Barak | | G06K 9/00288 |

* cited by examiner

440

```
{
    "id": "urn:hbo:feature:GVhxAxgVh5ZRpwnAKAABm",
    "statusCode": 200,
    "headers": {
    "ETag": "\"b42-OK+jqM3eile9GpXf1m+7fg\"",
    "Cache-Control": "max-age=12190"
    },
    "body": {
    "titles": {
    "short": "Baby's Day Out",
    "full": "Baby's Day Out"
    },
    "summaries": {
        ⋮
    },
    "images": {
    "largeTile": "https://artist.api.lv3.cdn.hbo.com/images/
GVhxAxgVh5ZRpwnAKAABm/
detail?v=NbNDapPBrYVTpYYNKPU6ug&size=1280x720&format=jpg",
    "mediumTile": "https://artist.api.lv3.cdn.hbo.com/images/
GVhxAxgVh5ZRpwnAKAABm/
detail?v=NbNDapPBrYVTpYYNKPU6ug&size=374x210&format=jpg",
    "smallTile": "https://artist.api.lv3.cdn.hbo.com/images/
GVhxAxgVh5ZRpwnAKAABm/
detail?v=NbNDapPBrYVTpYYNKPU6ug&size=280x158&format=jpg",
    "background": "https://artist.api.lv3.cdn.hbo.com/images/
GVhxAxgVh5ZRpwnAKAABm/
background?v=GSREhVKMCRYSEc5J9KThCA&size=1920x1080&format=jpg"
        ⋮
    }
}
```

*FIG. 4*

IMAGE PROVIDING SERVICE

CROSS-REFERENCE TO RELATED APPLICATION

The present application claims priority to U.S. provisional patent application Ser. Nos. 62/187,135 filed Jun. 30, 2015 and entitled, "IMAGE PROVIDING SERVICE," and 62/240,888, filed Oct. 13, 2015 and entitled, "CONTENT DISTRIBUTION TECHNOLOGY." The entireties of these applications are incorporated herein by reference.

BACKGROUND

Client users interact with information via user interfaces, such as menus of data items (e.g., buttons, tiles, icons and/or text). Part of the user interface may include images, such as displayed on tiles used to represent selectable menu items, e.g., items corresponding to movies, television shows and other video content.

The images that are suitable for one device may not be suitable for another device. For example, a large television screen may show relatively large, high-resolution images whereas a smaller display such as on a smartphone or tablet device may need smaller images with appropriate resolutions. Further, an image may be customized to a device, e.g., composite a title over an image at a specific location with a specific font for device A, and do something different for device B. To make available the many (e.g., thousands) of images needed, one alternative is to have a team of people manually composite the featured images using image tools, with various sets of properties for the different types of consumer devices that will be displaying those images. This is labor and resource intensive.

An alternative is to have each client device download the images in generally the same format/resolution, then composite a final image for each rendering at the client. This is computationally expensive and does not work well for low-performance devices.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards a service that processes a base image into a resultant image, including compositing the base image based upon purpose information into the resultant image. The service associates an endpoint reference with the resultant image, including encoding an image identifier and into the endpoint reference to provide for querying for the resultant image with a purpose query parameter via the endpoint reference.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which:

FIG. 4 is an example of a partial response to a client including references (URLs) to one or more images available to that client, according to one or more example implementations.

DETAILED DESCRIPTION

Figure 1:
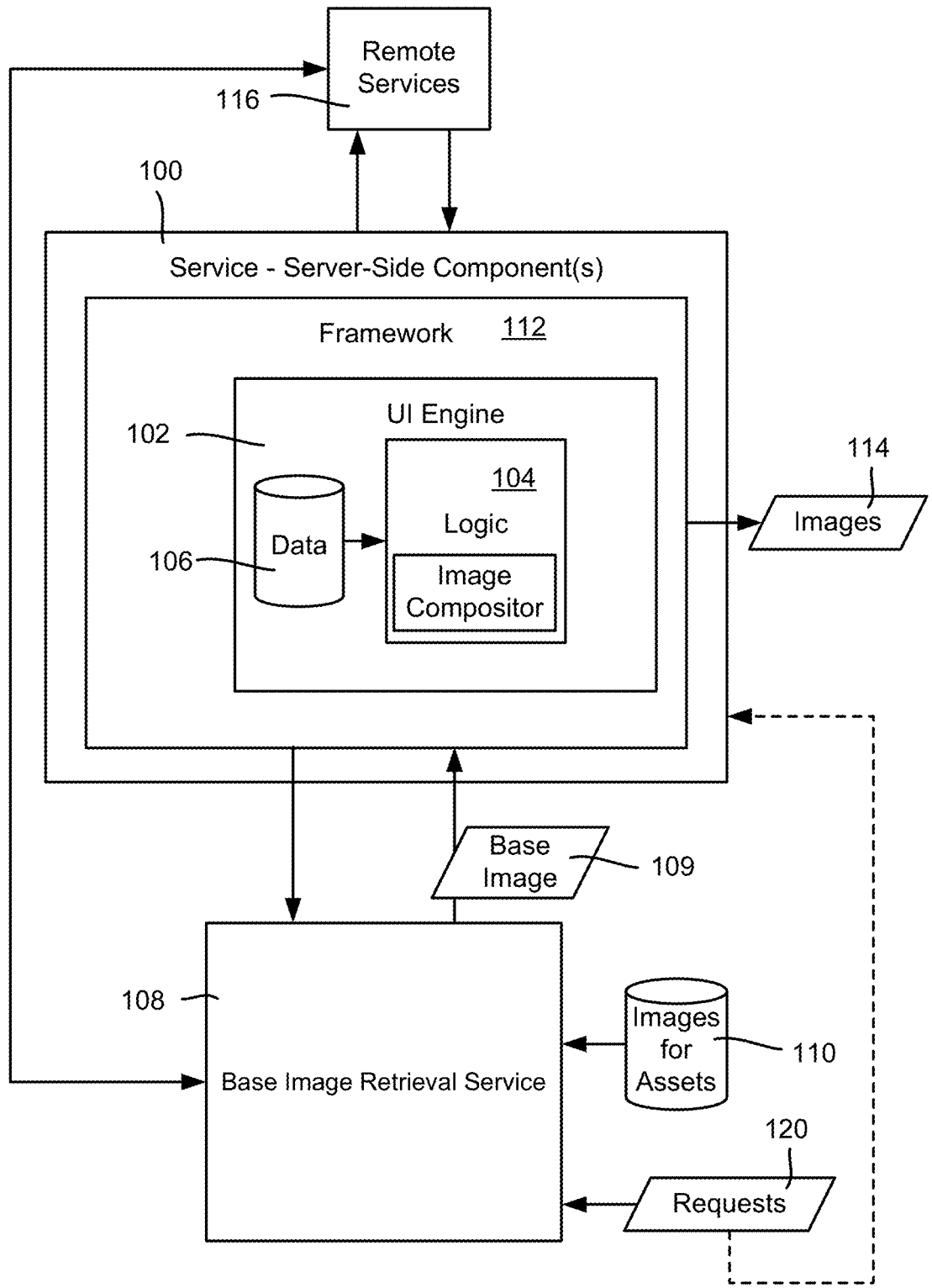
FIG. 1 is an example block diagram representation of server-side components including for compositing a base image into a composited image, according to one or more example implementations.

Various aspects of the technology described herein are generally directed towards compositing featured images in a server, (e.g., of a data service or the like), and providing access to those images. For example, once composited, the resulting images may be saved on a content delivery network, e.g., in a cache thereof, where client devices can download the images without needing to compose them. As will be understood, this saves the clients' computational power (if such client device power is even sufficient) that would otherwise be used for processing images, and it saves resources from the perspective of the data source (e.g., enterprise) that provides the images.

In one or more implementations, only a limited number of images can be maintained, and thus a client may only request images based upon a fixed set of query parameters. To this end, instead of having a service that takes in a very large number of parameters and composes each image based on them, a client is run in the web that contains the logic as a service, with a straightforward endpoint provided for any client device of any set/class to retrieve the final image as described herein. Those images may be pushed to the content delivery network for fast retrieval by end (e.g., consumer/subscriber) clients.

In one or more implementations, because the server is relatively high-powered, the server can perform image processing to composite images in a manner that may be anywhere from straightforward to relatively sophisticated, as described herein. Once the image is generated, the server takes a screenshot, which then becomes an image suitable for that actual category of device being emulated.

Examples of image processing may include cropping, resizing, (to match aspect ratios), rotating, overlaying text (and/or possibly overlaying icon(s), logo(s) and so forth) over a base image, and so forth. The overlay operation may be intelligent; for example, to protect text visibility, the overlay process may ensure contrast relative to the background, such as by selecting text colors, using a gradient (or more) if needed, making part of image darker for light text to overlay (or vice-versa). Further, placement of overlaid text may be intelligent; e.g., to use face/object detection and/or facial recognition or recognition of other objects so as to not overlay text on a face or significant item, and so on. Cropping may likewise be intelligent, so as to not remove significant faces, items and so forth.

To this end, there are predefined specific sets (categories) of clients, including ten-foot clients (e.g., for large displays such as widescreen televisions), three-foot clients (e.g., for PC monitors/smaller displays), mobile clients (e.g., for tablet devices and smartphones), and so forth. For each set of clients, logic directed towards what image parts to download, where to place each piece, what font to use, what color, and so forth, is, in general, relatively specific to that set of clients. At least some of those composited images may be pushed to the content delivery network for fast retrieval.

It should be understood that any of the examples herein are non-limiting. For instance, some of the examples refer to data including images related to client selection of video content (including audio) from a streaming service that delivers movies, television shows, documentaries and the like. However, the technology described herein is independent of any particular type of data, and is also independent of any particular user interface that presents the data as visible representations of objects or the like. Thus, any of the embodiments, aspects, concepts, structures, functionalities or examples described herein are non-limiting, and the technology may be used in various ways that provide benefits and advantages in data communication and image processing in general.

FIG. 1 shows example server-side components of an image processing service 100 including a user interface (UI) engine 102 that contains and runs logic 104 and accesses data 106. In general, the data 106 is obtained from a metadata service and includes information that specifies what image goes where (e.g., a URL referencing the image), image positioning, size and so forth, what font(s) to use, what text to write, what color to use, and so forth.

Also exemplified is a base image retrieval service 108 that retrieves a base image 109 of an image asset (from a set 110 thereof) in any suitable resolution and format. The base images 110 may be obtained from various sources described herein, such as ingested based upon an administrative tool or one or more image servers/services. Further included in one example implementation is a framework 112 that allows the UI engine 102 to run without being attached to a client device, (e.g., as a phantom client) and that composites and outputs the composite images 114, such as for requests 120 to the base image retrieval service 108.

Thus, one alternative set of operations in FIG. 1 is to have the request 120 ask the base image retrieval service 108 for a composited image, e.g., using query parameters such as deviceType, experienceType, and/or a 'composited=true/false' parameter. For example, a request may specify a purpose and design type information, e.g., provide an image for a ten-foot experience design using TILE purpose.

The base image retrieval service 108 may reroute (e.g., act as a proxy) to the service 100 to handle the image compositing (by asking base the image retrieval service 108 for a base image, the processing the image and so forth), and return the result to the base image retrieval service 108, then back in a response to the client request 120. Notwithstanding, another alternative is to have the request 120 call the service 100 (e.g., via a content delivery network), as represented by the dashed arrow. Upon such a call, the service 100 asks the base image retrieval service 108 for the base image 109, and performs the compositing process and so on, with a response returned from the service 100.

As exemplified herein, the base image retrieval service 108 (FIG. 1) may provide images that are associated with a streaming video (or possibly audio) service. For example, consider that a client device such as an entertainment console or tablet device wants to provide a menu of interactive tiles representing movies to a user, so that the user can select a particular movie for playback. Each tile has an image representing the movie, such as taken from a scene in the movie, or perhaps from the movie's original poster, or of a famous actor in the movie. The base image retrieval service 108, in conjunction with the server side-components, provides those images to client consumers, after processing as described herein.

In general, each image has its own endpoint; there is set up a service, such as with an example generalized endpoint:

http://baker.api.cdn.hbo.com/<imageId>/<experienceType>.

The server-side components 100 including the base image retrieval service 108 also may be coupled to various remote services 116. For example, to convert between different file formats and/or to resize images, any suitable image processing tool may be used, e.g., GraphicsMagick (GM), a relatively fast open source tool (http://www.graphicsmagick.org) or Sharp (https://github.com/lovell/sharp).

To summarize, as generally represented in FIG. 1, one exemplified system runs the UI engine 102 under the framework 112 (the framework and/or engine may run as a "phantom" program, without an actual client device). The system server-side components 100 communicate with the base image retrieval service 108 to retrieve the base image 109, then composite a final image 114 based on the experience Type (described herein) corresponding to the endpoint, similar to what a powerful client device may do. After the image is prepared, the system asks the UI engine 102 to render the image, e.g., take a 'screenshot' of the final result in a suitable/desired image format. The system then sends (or returns when requested) the composited data comprising the image 114 to the content distribution network (CDN) to be cached, in association with a URL. By knowing the ID, design type information, and the URL to get the base image after it is properly resized and optionally protected via the base image retrieval service 108, the UI engine 102 has what is needed to get the data 106 and further compose the image with text and violators. In this way, client devices get the image of an appropriate format and resolution for each category or the like of each client device.

Figure 2:
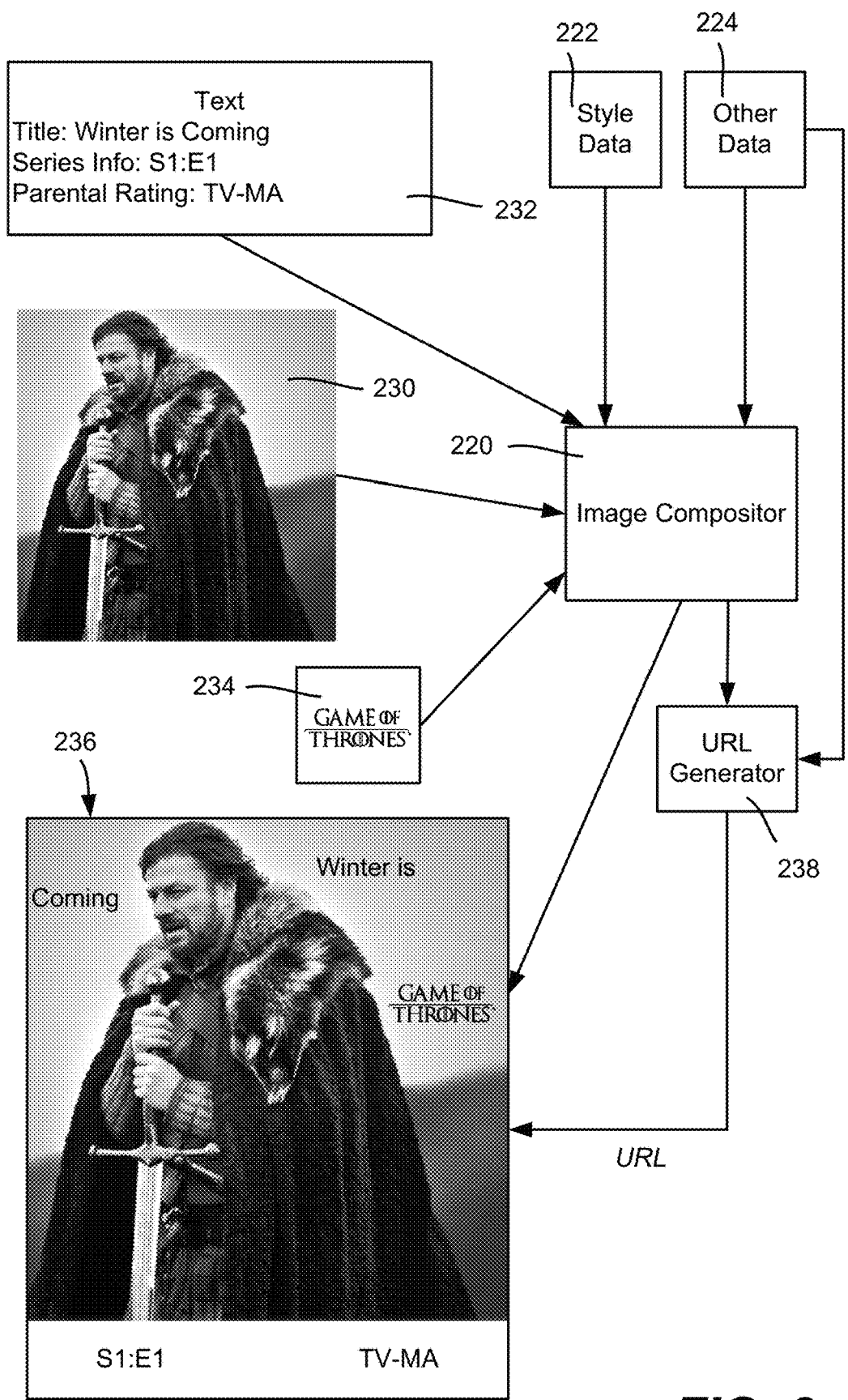
FIG. 2 is an example representation of a base image and associated data processed into a composited image based upon style data and other data, according to one or more example implementations.

FIG. 2 shows an example of an image compositor 220 (e.g., within the logic 104 of FIG. 1). As described herein, the image compositor uses style data 222 (e.g., text color, font and font size, background colors), and other data 224 to process the image, including compositing and otherwise image processing by arranging the various elements, cropping, resizing and so forth.

Thus, in the example of FIG. 2, the image compositor 220 obtains an image 230, text data 232, and an icon/logo 234, and processes them as set forth according to the data 224 to composite them into a resultant image 236 based in part upon the style data 222. A URL is generated (block 238) for the resultant image, and the image cached, e.g., at a cache 338 of a content delivery network 340 (FIG. 3) (which may be any suitable cache or set of caches), e.g., with a suitable key as described herein.

Figure 3:
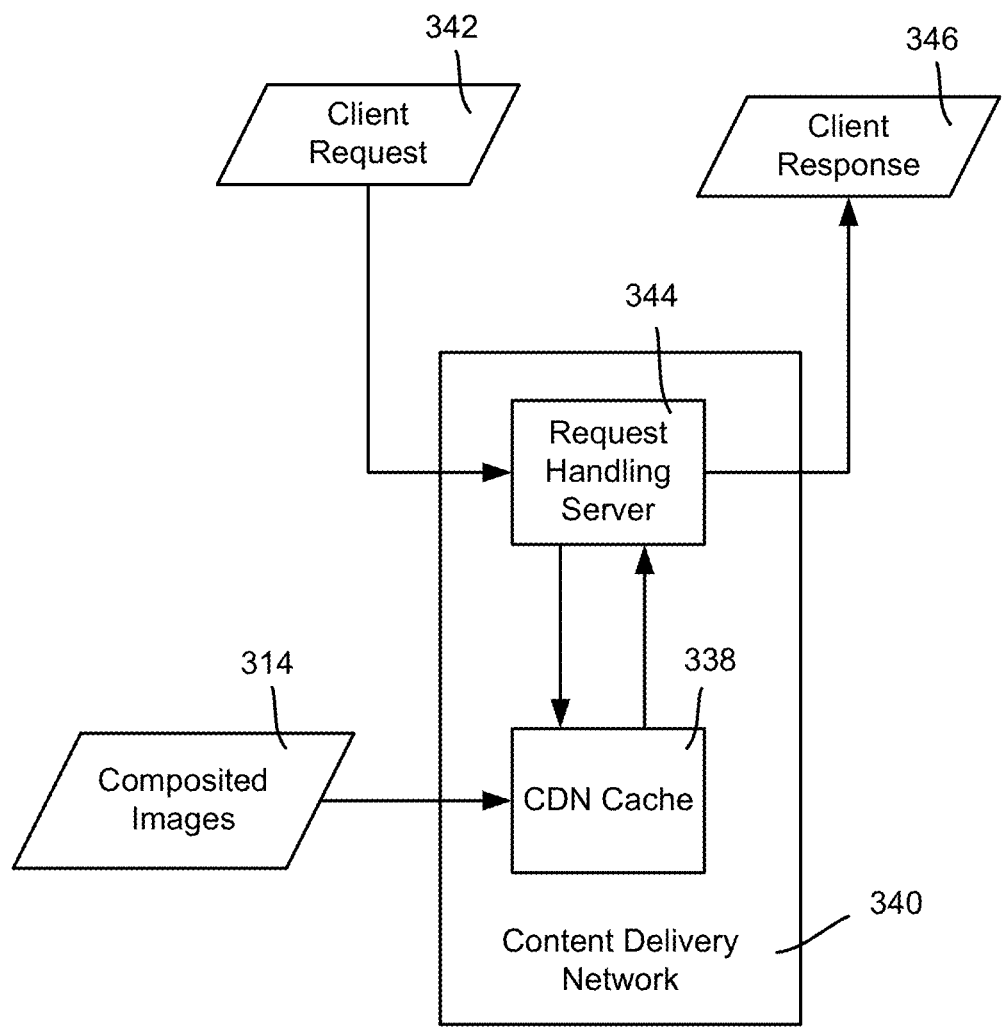
FIG. 3 is an example representation of a client request for an image being returned from a content delivery network that caches composited images, according to one or more example implementations.

FIG. 3 summarizes an example of a client request 342 being received at a request handling server 344 of the content delivery network 340. Typically the cache 338 contains a relatively large number of client images 314, e.g., pulled (or possibly pushed) from the server-side components as exemplified in FIGS. 1 and 2. When the client request 342 is received, (e.g., at a server 344 of the content delivery network), the composited image is obtained from the cache 338 and returned in a response 346 to the client. Note that the cache 338 may be pre-populated, at least to an extent, by test requests and/or requests intended for cache pre-population.

If the image is not cached or is cached and expired, the content delivery network 340 requests the image for returning to the requesting client (and for caching). The image may be retrieved from another cache, if available, or may be generated on demand based on received parameters (e.g., client-specified data). Thus, as described herein, a requested image may be composited and returned on demand. Note that it is also possible that an error is instead returned, e.g., if the base image cannot be obtained by the base image retrieval service 108 (FIG. 1), and so on.

As one result, the complicated/computationally expensive image compositing logic does not need to run in an actual client, which keeps the client code for rendering its image relatively straightforward, providing improved performance and fewer bugs. Further, if an update needs to be made, the clients will get the update directly, without a new deployment to the clients.

To summarize, there are defined sets/categories of clients such as ten-foot, three-foot, mobile, and so forth. A client in the web that contains the image processing logic is run (e.g., emulated) as a service, with a simple endpoint provided for any client in any set to retrieve the final image. Those images may be pushed to the content delivery network 340 for fast retrieval.

FIG. 4 is a representation of an example (redacted) client response 440. As can be seen, when a client makes a request with an ID, (e.g., for a graph node or tile to render as a user interface object), the response in this example contains a number of URLs, each referencing an image, which in this example comprise tile images (large, medium and small) and a background image. The client may then retrieve any or all of those images via each image's URL.

Figure 7:
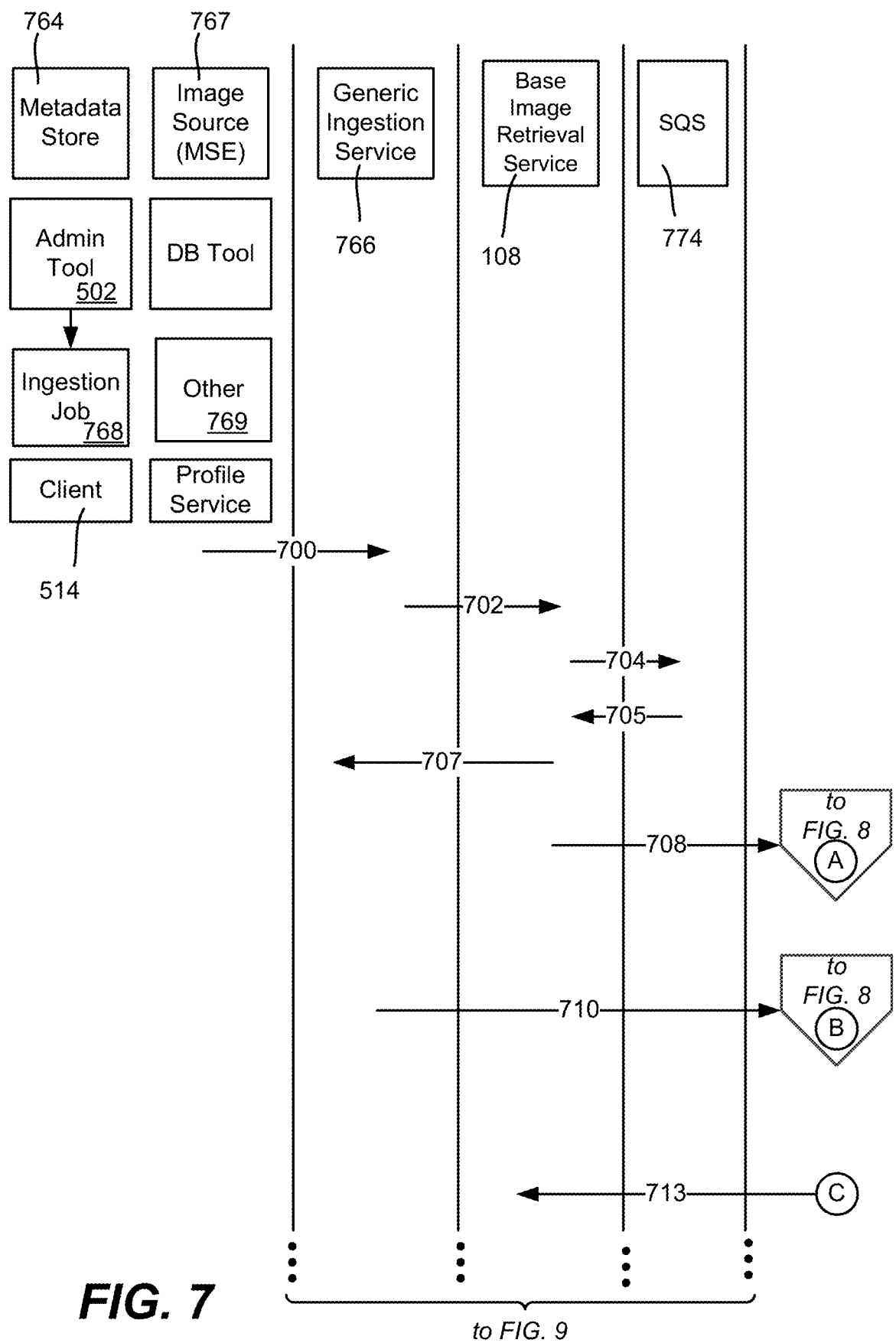
FIGS. 7-10 comprise an example dataflow and timing diagram of various communications between components generally directed towards obtaining an image, according to one or more example implementations.

Turning to an example implantation, an administrator tool 502 (FIG. 5) and a metadata store 764 (FIG. 7) each may be aware of device categories and resolutions. In one implementation, the metadata store 764 is where the metadata resides for a streaming content enterprise that provides the images in association with streaming audiovisual content. A data service (e.g., comprising a client-facing front end component 506 and back end component 508) obtains the data from the metadata store 704, e.g., via communication with an associated editorial override data source 510 and catalog data source 512, and serves the data to different content consumers represented by client/client services 514. Non-limiting examples of client devices include, for example, linear, dedicated streaming television receivers, HBO GO®, and other products.

In one or more implementations of the metadata store 764, there is generally no concept of a specific image belonging to a device. In other words, the metadata store 764 is device agnostic, and thus there is not different catalog metadata for each device.

However, in order to accommodate the demands of different resolutions per device, the metadata store creates image types (e.g., as described above) such as DETAIL_480×270, DETAIL_100×200, THUMBNAIL_MEDIUM, and so on to help its clients know the 'purpose' of the image different resolutions. Note however that the metadata store is still device agnostic; for example, it assumes if two devices want a particular image of 480×270 size (which inherently specifies aspect ratio) and resolution, both devices use the same image.

Thus, in the metadata store 764 and the administrator tool 502, there is a concept of Image_type or the purpose of an image. Some non-limiting examples of purpose may include: Thumbnail, Stage, Hero, Series, Season, Detail, Slideshow, and so forth. A requesting entity may select the purpose it wants to use for an entity in a page and asks the base image retrieval service for an image. In one client platform for an entertainment device/HBO GO®, there is only one resolution per purpose per entity; a new purpose may be created if a use case falls outside of this axiom.

Figure 5:
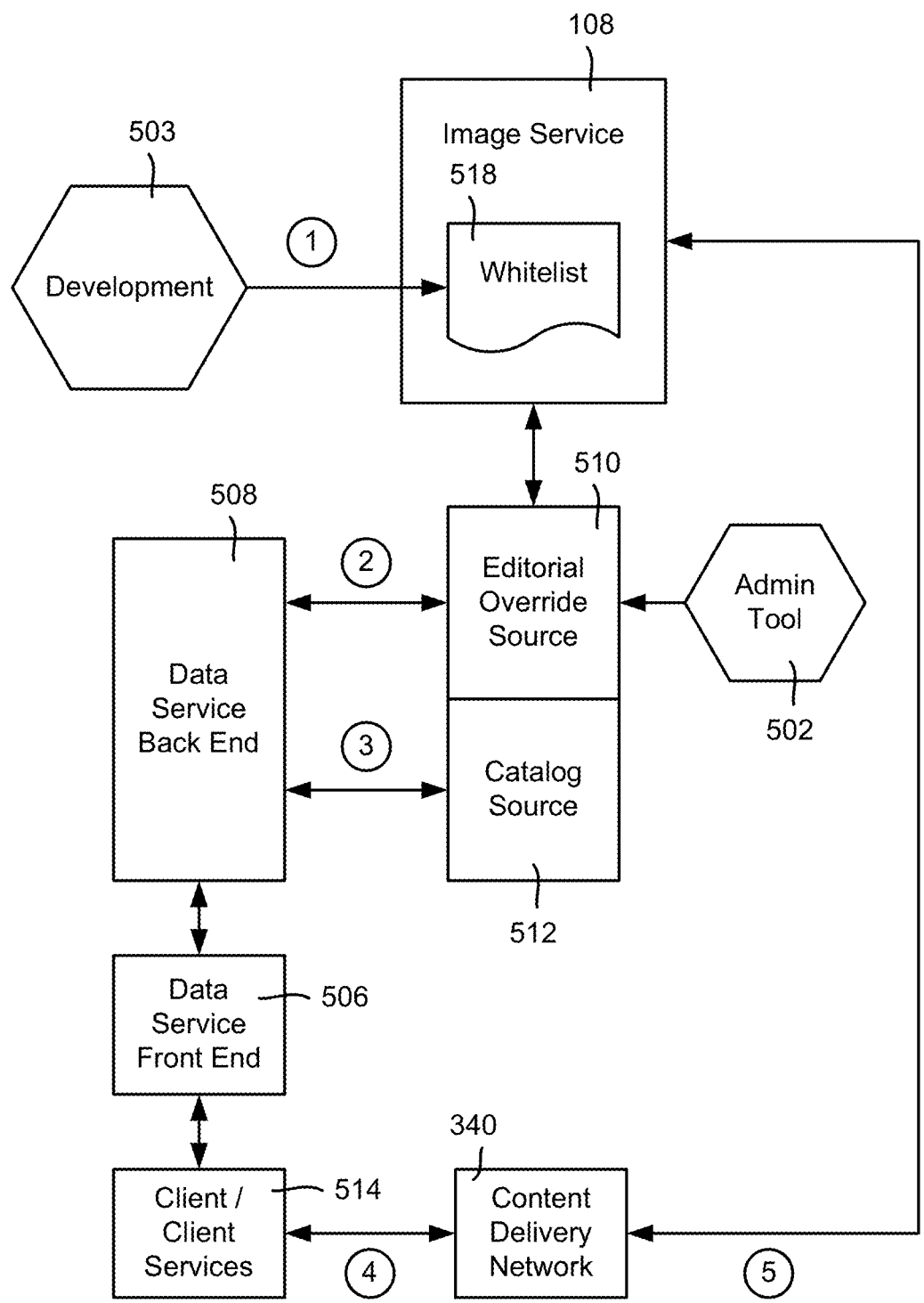
FIG. 5 is an example of an architecture including various interrelated components for making images available to clients, according to one or more example implementations.

As shown via labeled arrow one (1) in FIG. 5, during development time, a developer 503 for a client registers the developer's desired sizes and formats with the base image retrieval service 108 via an internal web page to whitelist them (block 518). Other alternatives that may be used instead of or in addition to whitelisting to block unauthorized requests to reduce service overload include using a token bucket and/or encrypting the version parameter value (of the image URL, described below).

As shown via labeled arrow two (2), during production time, the catalog source 512 and the override source 510 send their responses when requested via the back end data service 508. When the data service back end 508 calls the editorial override source 510, the data service back end 508 already knows the device-specific information (e.g., its category, class or type) for which it is calling. For example, the data service back end 508 calls the editorial override source 510 API, e.g., with a call such as:

"ecs.api.hbo.com/domestic/hbo/free/xboxIseries/landing"

which will return a list of tiles. An example body may appear as:

```
<entity> (tile or query from overrideSource): {
    ...
    ...
    images: {
    media: /images/G123/thumbnail?v1,
    ...
    ...
    },
}
```

Note that that G123 points to an image that is already curated for Xbox for this page for this tile. Further note that there may be no image from the editorial override source 510.

The data service back end 508 may make queries to the catalog source 512 to complete additional data that any tile needs (such as image, title, tagline, umbrella), and put them in a field, e.g., called "additionalFields". For example, if the editorial override source 510 does not supply an image for a tile, the data service back end 508 obtains and uses the thumbnail from the catalog source 512; (the editorial override source 510 does supply an image, the data service back end 508 instead uses that override image instead). The data service front end 506 knows the domain host of the base image retrieval service 108 and the content delivery network (e.g., 340, FIG. 3) that the data service chooses to use. The data service front end 506 may add the prefix to the relative URL.

An example result to a client is set forth below:

```
{
  "id": "urn:hbo:series:GVTLQ3ApaHb-CkA8JARFg",
  "statusCode": 200,
  "headers": {
    ...
  },
  "body": {
    "titles": {
      ...
    },
    "summaries": {
      ...
    },
    "images": {
      "tile": "https://artist.api.lv3.cdn.hbo.com/images/GVTLWfQGatb-CkA8JARbf/tile?v=f14c19e7-a5da-4cc6-bc3a-c8c87000684e&size=1458×820&format=jpeg",
      "logo": "https://artist.api.lv3.cdn.hbo.com/images/GVTLWfQGatb-CkA8JARbf/logo?v=f14c19e7-a5da-4cc6-bc3a-c8c87000684e&size=690×388&format=jpeg",
      "hero": "https://artist.api.lv3.cdn.hbo.com/images/GVTLWfQGatb-CkA8JARbf/hero?v=f14c19e7-a5da-4cc6-bc3a-c8c87000684e&size=434×244&format=jpeg",
      "background": "https://artist.api.lv3.cdn.hbo.com/images/GVTLWfQGatb-CkA8JARbf/background?v=7a2ca0b6-42b9-49c4-93fa-497f98f3ee88"
    }
  }
}
```

The client 514 knows the requirement of the devices per image type and page. For any Landing Page, the client 514 gets the image reference, and calls the URL. For any catalog page (such as "Movies A-Z" or an "Episode Detail" page), the client knows whether it wants this image to be rendered as a 'hero' or 'background' for example and thus from the resulting data, the images.background may be selected to render; for example:
http://cdn.artist.api.hbo.com/images/GVTLWfQGatb-CkA8JARbf/background?v=1

The client 514 (and/or the front end service 506, which is aware of the client devices and their needs) adds the query parameters (?size=and format) to those image URLs per page, e.g.:
https://CDN.artist.api.hbo.com/images/G123/thumbnail?v=I &size=100×100&format=jpg.

In one or more implementations, the image service 108 needs an authorization (OAuth) token to proceed. Assuming an appropriate token is provided, the client 514 follows the URL and hits the content delivery network 340 (arrow four (4)), which retrieves the image if cached.

As represented via labeled arrow five (5), if the content delivery network 340 misses the cache, the content delivery network 340 makes a call to the image service 108. Note that the image service 108 rejects unauthorized requests (e.g., via a shared header, encrypted parameter, and whitelist), telling the content delivery network to cache such a rejection response with short TTL. Otherwise, the image service 108 looks at G123, and the thumbnail purpose and the best matching resolution from its list of images under the purpose, resizing and/or otherwise processing the image as needed. The content delivery network then caches the image for future requests. The image service assigns cache-control headers for both the content delivery network 340 and the client 514.

The administrator tool 502 is a tool used by the streaming service (e.g., HBO GO®) editorial team that designs the landing (feature pages) per device. The administrator tool 502 is device-aware. Each landing page and 'tile' in the page is tailored for a device. Thus, the administrator tool 502 accesses approved images from a digital library, edits them, overlays any text thereon, and assigns the image for a tile. To those images, admin_tool may assign a different Media_sub_type to them, such as XBOX_Thumbnail_medium, PS4_Stage_med, and so on. An ingestion job converts such types to an image purpose (e.g., Tile, or background, which are not device sensitive).

One difference is that when the data service ingests an image, it basically represents "the image of a feature (or any catalog entity) for a purpose that is of this resolution," (and not "the image of a device of a feature for a purpose"). In contrast, when the administrator tool 502 ingests an image, it basically represents "the image of a tile of a page of a device for a purpose." Note that the administrator tool 502 assigns an image to a tile only when needed. By default, the image of a tile comes from the catalog data source/store 512, unless the administrator tool specifies it is to be overwritten, e.g., via the editorial override source 510.

Figure 8:
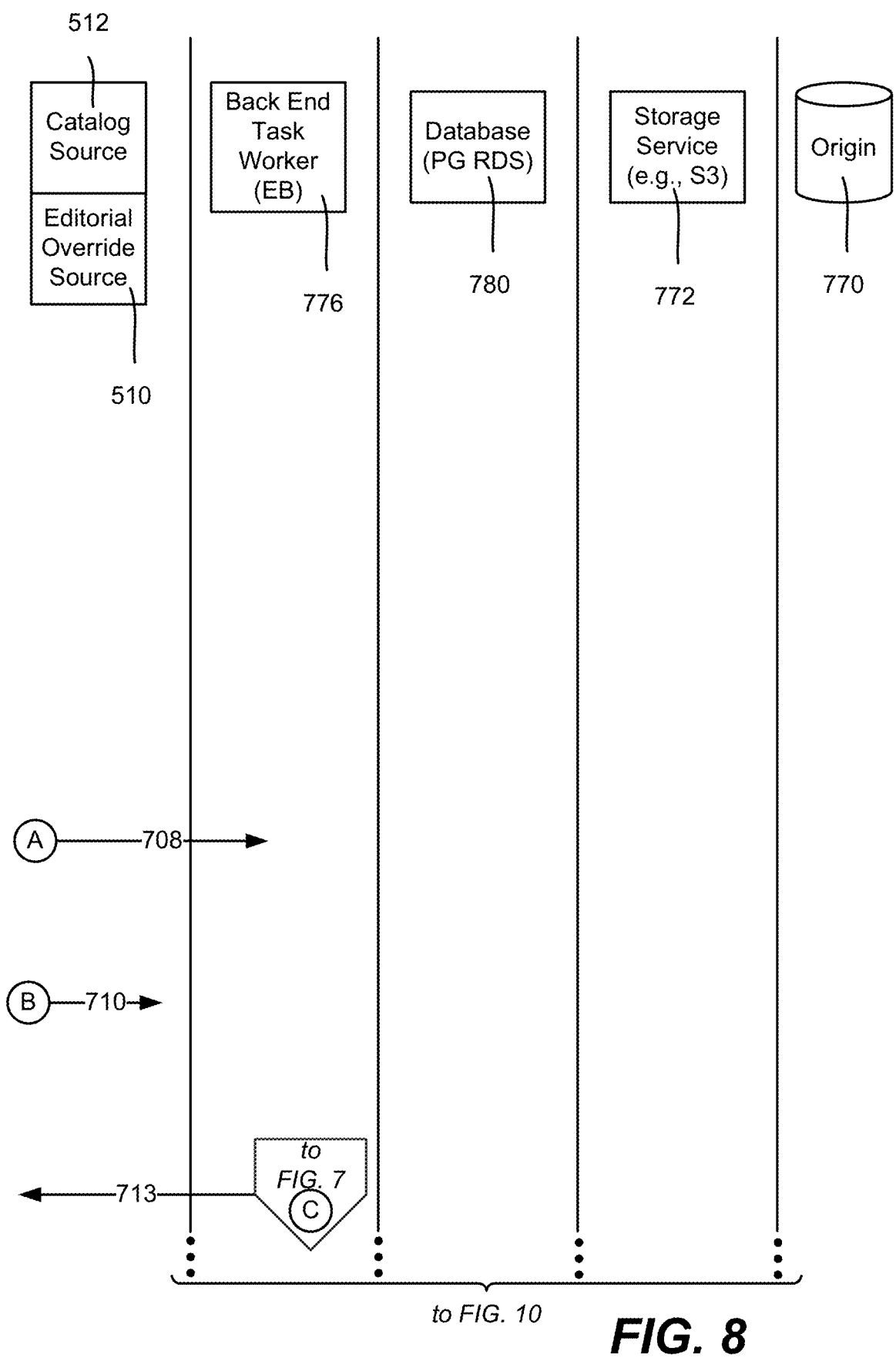

In one or more implementations, one architecture is a pull model. The content delivery network 340, instead of pointing to an image on the origin 770 (FIG. 8), points to a service (e.g., the base image retrieval service 108) that provides the image. There are techniques to invalidate content on the content delivery network, including invalidating the object, and using a versioned object name. Versioned object name invalidation operates by providing a new URL for clients when a requested catalog or overridden image gets an update. A benefit of the new URL version is that it indirectly invalidates any client's local image cache, and it gives the ability to keep track of version information. It also does not require the content delivery network to have a mechanism for invalidating the object. Thus, in one implementation because the globalId (a unique identifier, assigned to an asset, which may be globally unique or unique at least within the data service) is not changed, a new parameter called "v" (for version) is used to provide a changed URL.

Example Parameters

Version: the latest hash (e.g., of the first seven letters) ingested, however it could be a random number/string or based upon some other scheme. Note that in one or more implementations, the version is encrypted during ingestion, and during a read is decrypted to ensure it is from a valid source.
Size: A string in the format of "Width×Height" (no space in one format).
Format: Image file format. Example supported resizable formats are: "jpg", "jpeg", and "png". An example of a non-resizable format is: "swf". The base image retrieval service may support any format, including formats that the image processing tool(s) support, as well as others when needed.
Protection: adding gradient overlay so text can be rendered clearly on top of the base image
Compression: specifies how much to compress the image to serve lower bandwidth devices. Typically a large image may be compressed with a lower compression setting, with the compression setting high for smaller images. By doing so, this it keeps bandwidth low and can help lower-bandwidth mobile devices.

scaleDownToFit: specifies that the client wants the image to be scaled down to fit a bounding box while maintaining aspect ratio The following is an example of a basic API:

---
GET API
---

Public API:
GET artist.api.hbo.com/images/<globalId of entity>/<purpose>?v=<version>&size=<widthxheight>&format=<format>

---

In one or more implementations, a globalId is not assigned to any image (or image file) because images are a way, not a file, to visualize an entity, such as Episode, Movie, Tile, Query, User, and so forth. Thus what is needed is the globalId of the entity. There are various ways to visualize any entity, depending on its "purpose," which is sent as a parameter. Thus, a GET request allows the client to visualize its requested entity in its terms (size and format) for a specified purpose, e.g., xyz. The base image retrieval service 108 has an endpoint (GET and POST) to get the image metadata under an entity ID and purpose.

To ensure that the base image retrieval service 108 is not opened to malicious attack via queries specifying many possible sizes and formats, in one implementation the base image retrieval service may have a whitelist of sizes and formats from which to choose. When a client developer wants to test a new dimension, such dimensions (and format) need to be white-listed via an appropriate process. Alternatively or in addition, there may be whitelist of aspect ratios, e.g., clients will use one ratio, (e.g., 16×9) but can dynamically ask for its multiples. To prevent against malicious attacks, any or all of token bucket style throttling, auto-mitigation, version encryption, and/or a whitelist of ratios may be used.

The following is an example of how an image is ingested into the base image retrieval service (e.g., "the base image retrieval service 108"), via a PUT API:

---
PUT API
---

Internal API:
PUT artist.api.hbo.com/images/<id of entity>/<purpose>
purpose -> [choose one from: "Detail, Logo, Hero, Season, Series, Slideshow, Thumbnail, Stage, Collection, Background, Tag, Home, Takeover, Image, Tile, TileZoom, TileBurnedIn, backgroundBurnedIn, logoPadded, placeholder, None"] case insensitive
PUT body
{
  "files":[
    {
      "hash":"1234abcd", // e.g., MD5 hash of the image
      "url": "http://hbo.com/image/hbo/asset/1234__1280x1020.jpg",
      "width": 1280,
      "height": 1020,
    },
    {
      "hash":"abck1234",
      "url": "http://hbo.com/image/hbo/asset/5555__1280x1020.png",
      "width": 1280,
      "height": 1020,
    }
  ]
}

---

Figure 9:
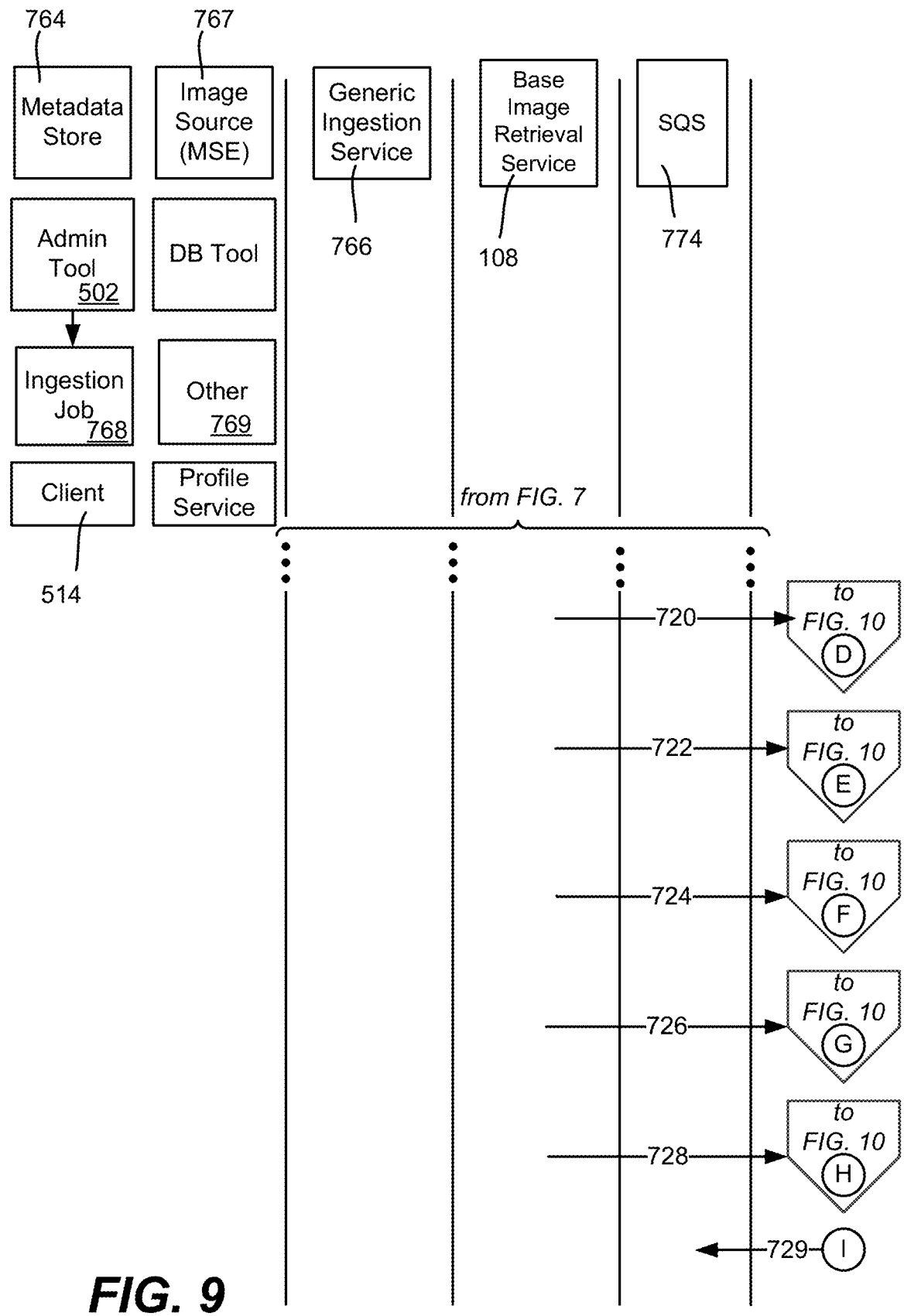

The following is a response the requestor source (e.g., an image ingestion service 766, FIGS. 7 and 9 "Cyclone") that provides the image for ingestion:

---
PUT Response
---

<text/plain string of the URL to Cyclone> artist.api.hbo.com/images/<globalId of the entity>/<purpose>?v=<version>

---

The following is a Post that gets images into the image ingestion service 766 (e.g., from two possible sources, "MSE" 767 (FIGS. 7 and 9) and an ingestion job 768 "Kansas", a tool that takes data from the Admin tool 502, translates the data, and puts it into the generic image ingestion service 766):

---
POSTING image to the generic image ingestion service 766 (image ingestion message body to the image ingestion service from MSE 767 or the ingestion job 768)
---

POST
{
  "deliveryId": "delivery1234",
  "..id": "urn:hbo:esp:domestic:Episode:ID__12345", // [choose one from: "episodeId, seasonId, seriesId, featureId, extraId, roleId, personId, imageId, userId"]
  "purpose": "Detail", // [choose one from: "Detail, Logo, Hero, Season, Series, Slideshow, Thumbnail, Stage, Collection, Background, Tag, Home, Takeover, Image, None"]
  "files":[
    {
      "hash":"1234abcd", // e.g., MD5 hash of the image
      "url": "http://hbo.com/image/hbo/asset/1234__1280x1020.jpg",
      "width": 1280,
      "height": 1020,
    },
    {
      "hash":"abck1234",
      "url": "http://hbo.com/image/hbo/asset/5555__1280x1020.png",
      "width": 1280,
      "height": 1020,
    }
  ]
}

---

With respect to hashing, after the initial bulk ingestion, the majority of the ingestion messages to the base image retrieval service 108 is a by-product of ingestion to the catalog data store 510 or the override service 510, and the image itself has no change. Thus, general goals include the avoidance of replacing images with the same images, or having to download images and compare them. Instead, a hash of the image file is passed in to compare images without downloading. This allows multiple globalIds to share the same reference to a file. If the compression of the image changes, it generates a new hash.

Figure 6:
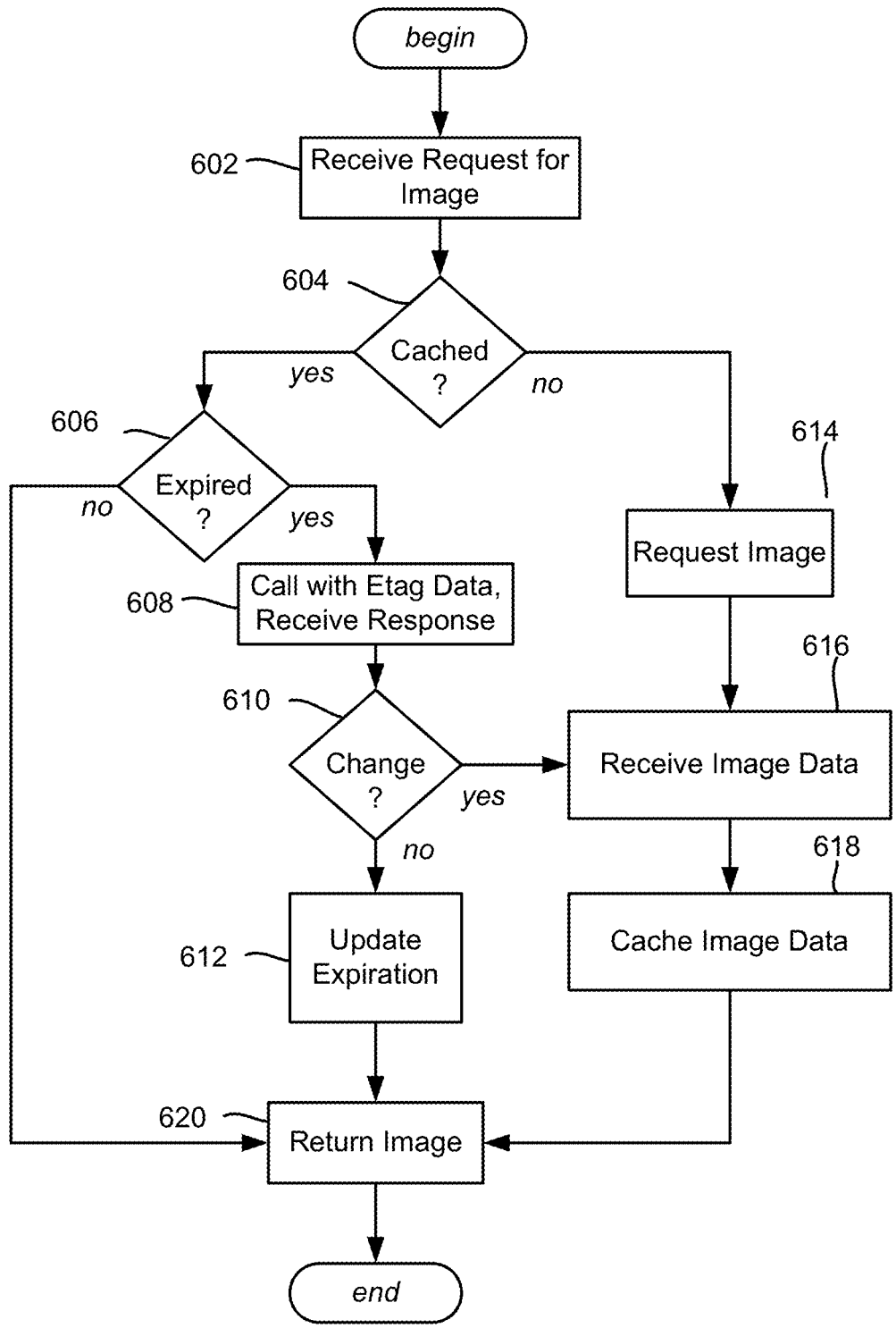
FIG. 6 is a flow diagram showing example steps that may be taken to handle a request for an image received at a content delivery network, according to one or more example implementations.

As generally represented in the example steps of FIG. 6, when the content delivery network gets a request for an image (step 602) via a key, the content delivery network checks its cache (step 604) for the image. If found and not expired at step 606, the image is returned at step 620. If not cached, the image is requested from the base image retrieval service at step 614.

If instead the image is cached (via the key) and has expired, the content delivery network calls the base image retrieval service at step 608, e.g., with an If-None-Match: <eTag> header to see if the resource has changed. If the eTag matches at step 610, then no change to the image has occurred and a suitable response (e.g., with a status code of '304') is returned to indicate this unchanged state, without the resource, to save bandwidth. In one or more implementations a new expiration time is returned from the base image retrieval service 108, and saved in the cache at step 612 so that future requests for that image need not repeat the eTag sending process until the key is again expired. The image is returned to the caller at step 620.

If no eTag matches at step 610, then the resource image data is returned with a status code of 200 as normal. When new image data is received at step 616, (whether via the request at step 608 or 614), the image is cached at the content delivery network 340 at step 618 and returned to the caller at step 620.

As can be seen, along with a new image, an eTag header is returned from the base image retrieval service 108. In one or more implementations, the <eTag> value is the hash of the closest matched source file, computed before resizing happens. In this way, a straightforward database call may be made to retrieve and compare the hash (against the eTag) so as to not make any call to the storage service 772 that contains the images. In contrast, when anything changes so that the closest match changes, the eTag comparison is different and the updated resource is returned.

In one or more implementations, hashing is part of the architecture. This may be done in various ways, including, for example to 1) rely on upstream sources (e.g., MSE and Kansas) to provide the hash; 2) have the image ingestion service 766 download every file, hash them, and send them to the base image retrieval service 108; 3) have the base image retrieval service 108 ask another service to download and hash every update image. Because the upstream sources are in close communication with the base image retrieval service 108, and the chance of a collision happening is significantly low, in one or more implementations upstream sources are relied on to provide the hash.

Figure 10:
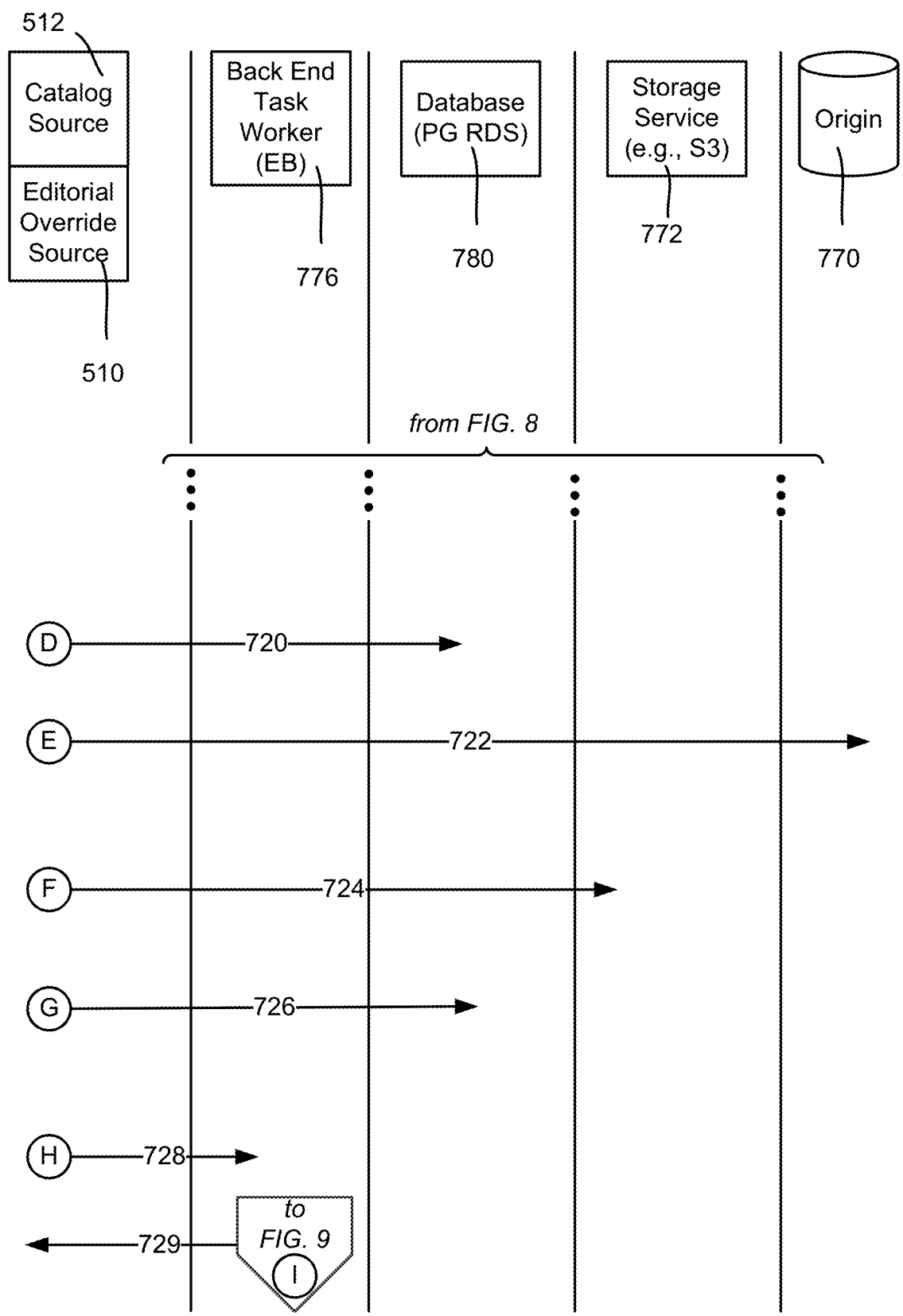

In one or more implementations, the base image retrieval service downloads the ingested images and stores them in the storage service 772 (FIGS. 8 and 10) in a flat data source bucket, e.g., under "hurley-artist/<environment>/images/". For example, the filenames may be the hash of the file plus its file format, e.g., abcd321XYZ.jpg. The base image retrieval service has permission to access files there. One suitable storage service is Amazon® S3, a simple key, value store designed to store as many objects as needed in one or more buckets.

Note that although possible to store the files in a more hierarchal way, e.g., /globalid123/jpeg/200×400/hash_abc321.jpg, one or more implementations do not want to couple the file to a globalId because the file can be shared by many. Not only is it straightforward to construct the path to the storage service, it also allows having better caching in the back (between the base image retrieval service and the storage service), which is especially useful for large images.

To get metadata of an image (e.g., size, globalId, purpose), a database is queried. The storage service 772 typically performs substantially the same whether there are millions of files under one directory or divided among different directories.

The base image retrieval service 108, by default, returns a 202 response to the image ingestion service's PUT requests before image ingestion is completed. The PUT requests are preserved so that in case the base image retrieval service 108 instance goes down, the ingest request is not lost. Non-limiting options for preserving such requests include SQS (Simple Queue Service), RabbitMQ, IronMQ, ZeroMQ, or Kafka.

SQS 774 (FIGS. 7 and 9) is used in one or more implementations, comprising a managed, highly available and scalable queuing service and is used in one or more implementations. The base image retrieval service 108 returns a 202 status to the image ingestion service 766 only after the message is successfully put onto SQS. Also setup is a SQS "deadLetterQueue", where if the messages are unsuccessfully delivered a number of times, the message will end up in the DeadLetterQueue, which is like an Error Queue.

SQS 774 is a poll queue; because the base image retrieval service 108 usually gets trickle feeds from the image ingestion service 766, it is desirable to separate out the polling logic out from the runtime request servicing logic. In one or more implementations, a worker process is used that (virtually) constantly polls from SQS 774 and forwards valid messages to the base image retrieval service 108 via HTTPS. A task worker such as an Elastic Beanstalk (EB 776, FIGS. 8 and 10) worker tier has the ability to hook up to SQS 774 so that SQS 774 sends EB 776 a message when SQS 774 gets one. In the configuration, an administrator or the like can specify how many HTTP connections there are with the base image retrieval service 108, thus throttling the request calls to the base image retrieval service 108. Environment variables/configuration variables may be set up that each tells each EB instance which base image retrieval service endpoint to call based on its environment. Note that the code stays the same in the different EB instances and EB can automatically scale.

EB may automatically use a service (e.g., CloudTrail) for monitoring and logging. When used, there is another API of the base image retrieval service 108 that is opened to calls from EB:

| End Point for EB to call |
| --- |
| Public API for Elastic BeanStalk:<br>PUT https://artist.api.hbo.com/internalUpsertImageFiles/<id of entity>/<purpose><br>body: {<br>  "files":[<br>    {<br>    "hash":"1234abcd", // e.g., MD5 hash of the image<br>    "url": "http://hbo.com/image/hbo/asset/1234_1280×1020.jpg",<br>    "width": 1280,<br>    "height": 1020,<br>    },<br>    {<br>    "hash":"abck1234",<br>    "url": "http://hbo.com/image/hbo/asset/5555_1280×1020.png",<br>    "width": 1280,<br>    "height": 1020,<br>    }<br>  ]<br>} |

Regarding the DeadLetterQueue, another EB task may be set up to listen to it, and as soon as the EB task gets a message, SNS or the like may be used to notify developers via email. Note that an alert notification may be received (e.g., via VictorOps®) due to the number of '500' statuses returned. Then a developer can then check the DeadLetterQueue, (e.g., using Circonus® to monitor SQS's deadletterQueue via cloudWatch and trigger alerts).

SNS may be used when a message fails to get ingested (e.g., due to an external dependency issue); the base image retrieval service may push an error message to SNS, which emails a developer to investigate. For example, SNS may be used when a GET request comes in and the aspect ratio does not match what is available; SNS may be used to send an email message to a designer/developer to investigate. Various metrics may be used to detect and trigger email alerts (e.g., via Circonus® or AppDynamics®) if aspect ratio, upscale, and/or other restriction rules are violated.

A database (e.g., Postgres RDS) may be used:

---

Schemas

---

RDS table schema:
Image Metadata Table:
<pkey> is a combination index of <globalId + purpose + size + format>,
globalId: 'G123', // <index> the globalId of the entity this image
represents purpose: 'thumbnail',
imageHash: 'hash1234', // <index> <foreign key to the File Location
Table>, Also used to compare images
format: 'jpg',
size: '100×200',
ratio: 0.5, // width divided by height trimmed to a defined decimal digit.
originalPath: 'http://hbo.com/image/hbo/asset/1234_1280×1020.jpg'
width: X, // (X represents any appropriate width value)
height: Y, // (Y represents any appropriate height value)
timestamp: Z, // (Z represents any appropriate timestamp)
// The path to S3 can be constructed by the bucketName/imageHash.format

---

As represented in FIGS. 7-11, components of one implementation of the base image retrieval service 108 may be considered to include the database 780 (e.g., Postgres RDS, or PG), a conversion engine 1184 (e.g., GraphicsMagick), a web application (e.g., Node JS 1180, a platform built on Chrome's JavaScript® runtime for building fast and scalable network applications, the content delivery network 340 and the storage service 772.

In general, there is one resolution per format, per purpose, per asset, where the image entity represents the image of the asset. An asset may be any tile/query/page in the editorial override data source 510 or any entity in the catalog data store 512.

In one or more implementations, the hash is a hash (e.g., md5) of the image. As described herein, the hash is used to compare images without downloading them. The upstream sources may choose which hashing algorithm to use.

Because there are many images with slightly different aspect ratios, (e.g., 1.7743 vs 1.7722), one implementation floors the ratio, e.g., to the third decimal point (1.774) and uses a difference threshold. In general, this is unnoticeable to client users.

Because many GlobalIds can reference the same file in the storage service 772, whenever it is known to be an 'update' of a resolution-format-purpose, the old hash is queried for, to see if other purpose(s) still use that file. If none exist, then the file from is removed from the storage service 772. An offline scan process also may remove unused images.

In the ingest flow of FIGS. 7-10, arrow 700 represents an ingestion source (e.g., 767) sending an image message to the image ingestion service 766/images, as described with above reference to the PUT body. Note that other tools or the like, shown as "other" block 769 can ingest imaged to the generic ingestion service 766, e.g., one such tool comprises a next version of the Admin tool 502 that also handles the ingestion job 768. In this example, the image ingestion service 766, at arrow 702, calls PUT /images/g123/thumbnail to the base image retrieval service 108, which calculates a new version ID. Note that there is an auth credential header to make sure the PUT request is from the authorized service 766. Arrow 704 wraps the request and sends a message to SQS. Arrow 705 represents the message received acknowledgement.

Arrow 707 represents returning an appropriate (e.g., '202)' status with the image URL including the new version ID, e.g.: artist.env.hbo.com/images/g123/thumbnail?v=123. Note that the base image retrieval service 108 returns the path, not the full URL including the host; the host and domain are inserted by the client or front-end service. For example, the result from the base image retrieval service 108 is /images/id/purpose?v=encryptedVersionHash As described above, the arrow 708 represents the worker task (e.g., EB sqs.d) obtaining the message from SQS 774. Arrow 710 represents taking the image reference, e.g., artist.env.hbo.com/images/g123/thumbnail?v=123 and ingesting the image into the metadata of the catalog data source 512 or override data source 510.

The arrow 713 represents a TaskWorker 776 calling the base image retrieval service's PUT /interIalUpsertImage/g123/thumbnail, including the check of the Auth credentials to make sure the get request is from Cyclone/TaskWorker. A '403' status is returned if unauthenticated; a '200' status is returned if it is a success.

The base image retrieval service 108 checks hash metadata with the database 780 (arrow 720). If the hash does not exist in the database 780, the base image retrieval service 108 obtains images from the origin (source) 770 (arrow 722). The base image retrieval service 108 stores files to S3 (arrow 724) if needed, e.g., /hurley-artist-<env>/<hash code>.<format>. The base image retrieval service 108 updates the database 780 (arrow 726), and returns a status code of '200' to the TaskWorker 776 (arrow 728). At arrow 729, the TaskWorker returns the '200' status and deletes the message from SQS 774.

Figure 11:
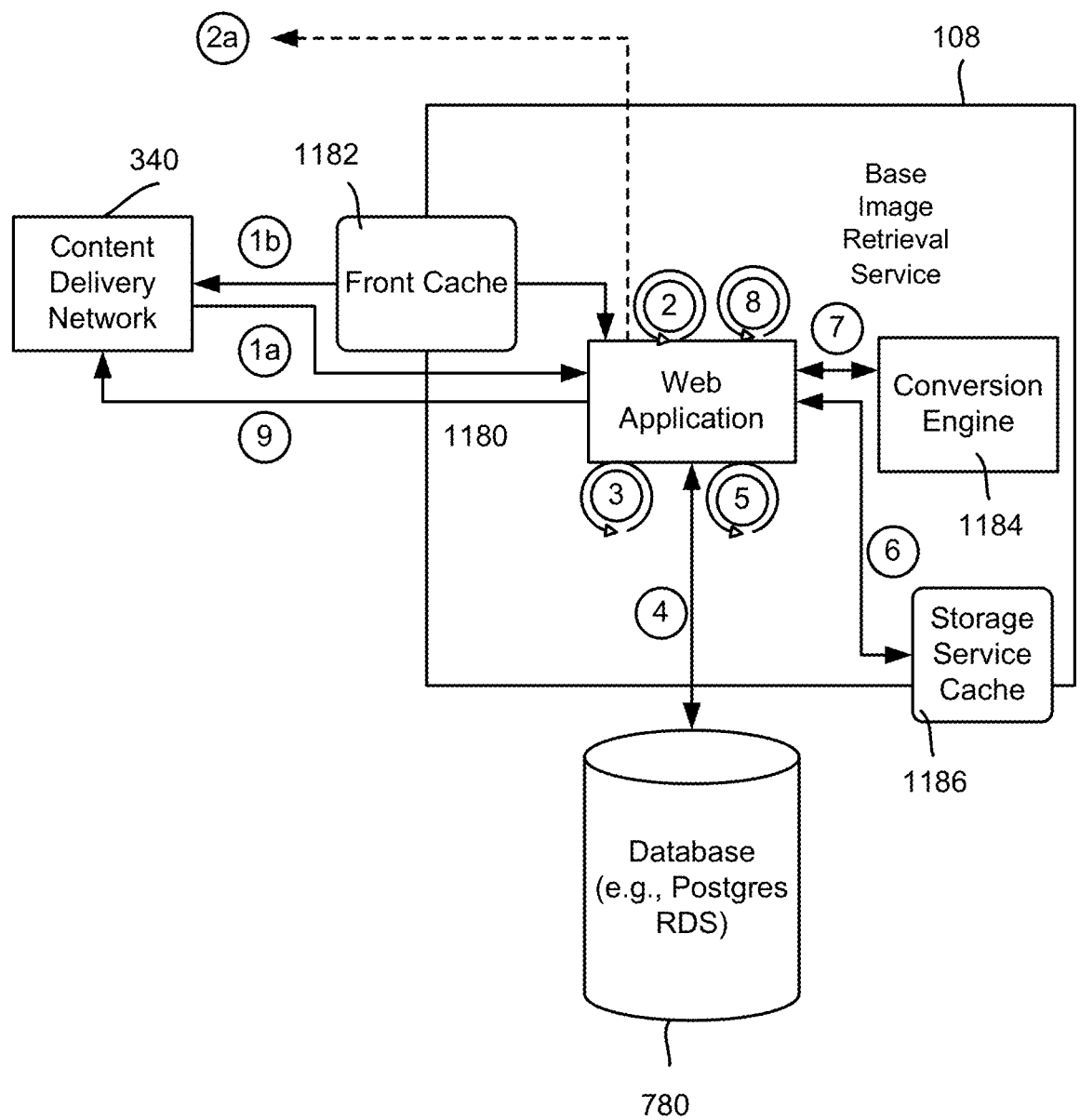
FIG. 11 is an example block diagram representation of a base image retrieval service handling a get request, according to one or more example implementations.

FIG. 11 generally represents how the base image retrieval service 108/content delivery network 340 handle a GET request, e.g., https://artist.api.hbo.com/images/G123/hero?v=abc&size=100×200&format=png. FIG. 11 assumes the content delivery network 340 does not have the requested image cached therein in a valid state and thus needs the image from the base image retrieval service 108, including as handled by the web application 1180 (e.g., the aforementioned Node JS application). This is generally represented via arrow (1a) in FIG. 11.

If a front cache 1182 of the base image retrieval service 108 has the requested image, the image is returned, as generally represented by arrow (1b); (such a front cache may be used or not based upon performance needs). Note that the web application 1180 at arrow (2) first checks the header for authentication; the developer and content delivery network 340 are authorized. Dashed arrow (2a) represents rejecting the request (e.g., with a '403' status) if unauthorized.

If authorized, the web application 1180 checks (arrow (3)) to see if the ratio and version encryption (and/or requested size and format) are in the whitelist 518 (FIG. 5). If not, the web application 1180 returns a '403' status while setting a short expiration time, e.g., "set s.maxAge to 1 minute." A '400' status is returned if there are insufficient parameters (e.g., size and/or format are missing) or if the parameter are invalid (e.g., size=abc).

If listed, as represented by arrow (4) the web application 1180 accesses the database 780 for image information, e.g., "SELECT*FROM image WHERE id=G123 AND purpose=hero." If found, at arrow (5) the web application 1180 selects the image that best matches the aspect ratio and resolution as described herein.

Arrow (6) then obtains the storage service file from the path, which may be cached in a storage service backend cache 1186. There is retry logic if needed to get the file from the storage service. If that fails, the file is obtained from the path to the origin; (If that fails, a default image is returned and a metrics/log Error sent).

The file is typically stored in the storage service backend cache 1186 backend cache. After selecting the image, via arrow (7) the conversion engine (e.g., GraphicsMagick) is used as needed to scale and/or convert to the image to the desired format, e.g., into a modified resultant image relative to the composited resultant image. At arrow (8), the web application sets the cache-control header, e.g., the device local cache defaults to five minutes and the default expiration (s-maxage) for the content delivery network 340 is one week. Note that the ETag header is set to be the image hash of the source (not the resized image). As represented by arrow (9), the resulting image is returned to and cached in the content delivery network 340, e.g., with a stats code of '200' in this example. The resized image may or may not be cached at the storage service.

Note that if not found, the default image may be returned, and the cache header s.max-aqe to be some shorter time such as one hour; (non-uniform scaling may not be performed in one or more implementations). An error log metric may be raised to notify developers. If the desired aspect ratio is not found, the system may select the biggest resolution file of the closest aspect ratio and may do non-uniform scaling. An error/warning log along with metrics may be made for notification purposes.

As described above, for an expired image request, e.g., https://artist.api.hbo.com/image/G123/hero?v=abc . . . with header If-None-Match: abc333, the best image match (as described above with reference to arrow (5)) is used.

The header (e.g., abc333) is checked against the image hash, with a '304' status returned with no body if abc333 is equal to the image hash. If they do not match, the process described above proceeding from arrow (6) of FIG. 11 is performed.

With respect to failure considerations, resizing may happen and may impact performance. Resizing and fetching may be separated to different services so that heavy resizing will not affect the performance of normal fetching. Note that one or more implementations scale down from the largest image (mezzanine).

Hash collisions can be virtually avoided by using a suitable hashing algorithm; a collision means that the new ingestion points to another file.

A spike may occur with a new popular show; however such a show typically has only a relatively few new images that need to be cached to the content delivery network. Thus, even if there is a spike, the base retrieval image service only gets hit that few number of times. Note that such images often are already cached, e.g., from prior testing and/or intentional cache pre-population.

With respect to alternatives, as can be readily appreciated it is feasible to use a 'page profile' to encapsulate Size and Format in the query parameter(s). A Push model is another alternative, in which a GET call to the base image retrieval service 108 does not return the image, but a URL to the content delivery network/storage to the resized image.

As can be seen, there is described an image providing service that makes images available to clients in a way that avoids client processing of the images. Based upon purpose information and design type information, clients get an image that matches or is based upon a requested size and purpose (along with possibly other specified parameters).

One or more aspects are directed towards processing a base image into a resultant image, including compositing the base image based upon purpose information into the resultant image. Described herein is associating an endpoint reference with the resultant image, including encoding an image identifier and into the endpoint reference to provide for querying for the resultant image with a purpose query parameter via the endpoint reference.

A request for the resultant image may be received from a content delivery network. The resultant image may be cached at a cache of a content delivery network.

A request for an image based upon the resultant image may be received, in which the request specifies a size. A request for an image based upon the resultant image may be received, in which the request specifies a version identifier as a query parameter. A request for an image based upon the resultant image may be received, with a compressed image returned in response to the request.

Compositing the base image may include overlaying text relative to the base image to composite the resultant image. Overlaying the text relative to the base image may include overlaying the text at a specified location and with a specified font. Compositing the base image based upon the purpose information into the resultant image may include selecting the image as a selected image based upon the purpose information and resizing the selected image based upon the size information to composite the resultant image.

The base image may be ingested into a base image retrieval service, for maintaining the base image at the base image retrieval service, and providing the base image to a service for compositing the image. A request for an image based upon the resultant image may be received. An image may be selected based upon a closest ratio, size, and/or format of the resultant image relative to information in the request, and the selected image, or an image resized based upon the selected image, returned in response to the request.

One or more aspects are directed towards an image processing service coupled to a base image retrieval service. The image processing service is configured to 1) obtain a base image from the base image retrieval service, 2) composite the base image into a resultant image, including by using purpose information to determine one or more attributes of the resultant image, 3) receive a request for the resultant image or a modified image based upon the resultant image, in which the request indicates a purpose, and 4) return the resultant image or the modified image in response to the request. The image processing service may use design type information to determine the one or more attributes of the resultant image.

The purpose information corresponds to one or more of: detail, logo, hero, season, series, slideshow, thumbnail, stage, collection, background, tag, home, takeover, image, tile, tile zoom, tile burned in, background burned in, logo padded, placeholder, and/or no purpose.

Also described herein is a content delivery network, to which the image processing service may be coupled to receive the request for the resultant image or the modified image from the content delivery network. The base image retrieval service may receive an image-related request from the content delivery network, and the communicate the request for the resultant image or the modified image to the image processing service based upon the image-related request from the content delivery network.

One or more aspects are directed towards receiving a client request for an image, in which the request specifies a purpose and size, and attempting to locate an image that corresponds to the purpose and size. If located, described herein is returning an image in response to the request, including performing any resizing of the image based upon the specified size. If not located, described herein is compositing a resultant image based upon the purpose information, including processing a base image into the resultant image, and returning the resultant image or a modified resultant image based upon the purpose or size, or both, in response to the request. The resultant image may be cached.

Composting the resultant image may include overlaying text relative to the base image. Compositing the resultant image may include overlaying the text at a specified location and with a specified font.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
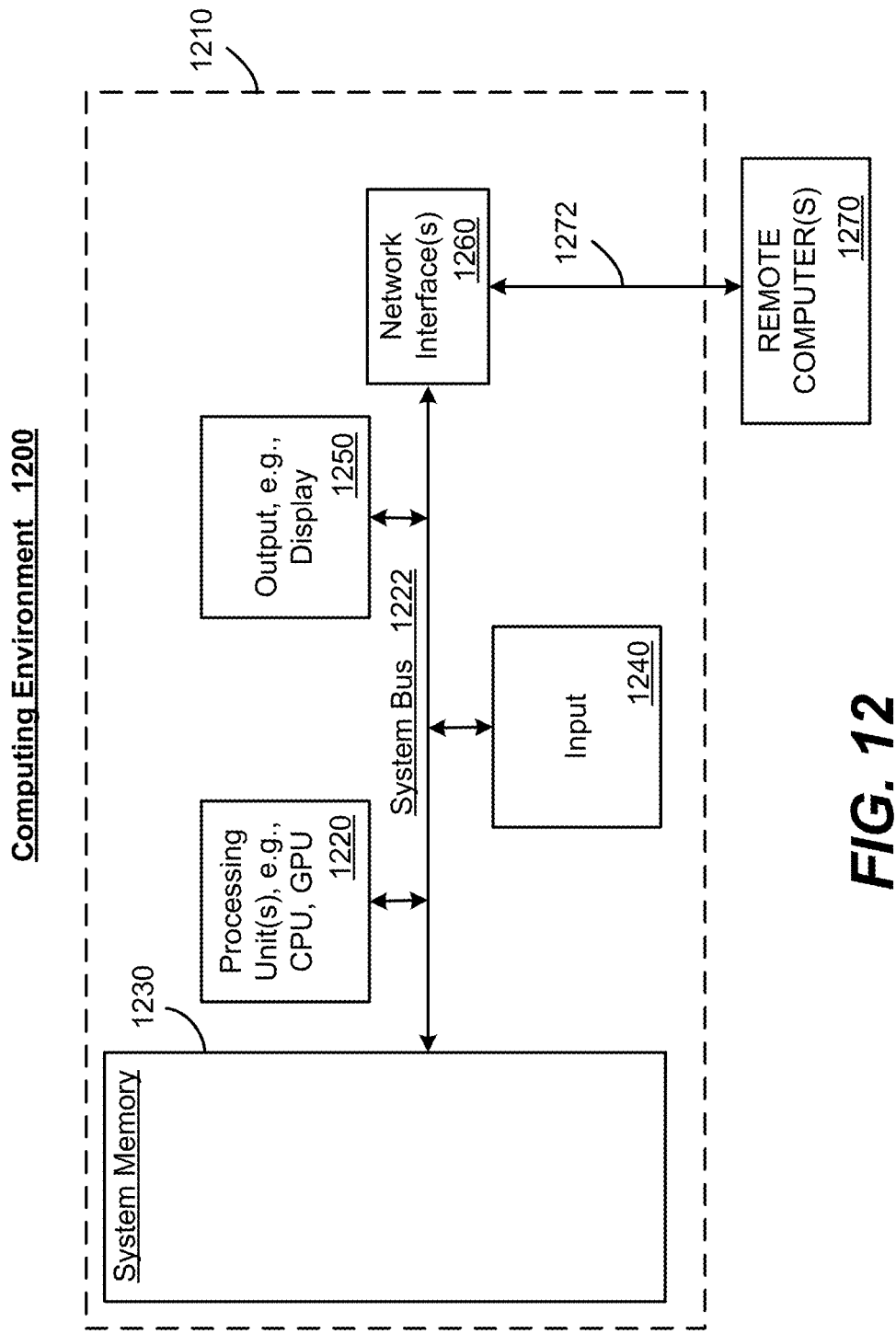
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth. By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    processing, by a server device comprising a processor, a base image into respective resultant images based on distinct defined purposes types of a set of purpose types;
    storing the resultant images at respective locations; and
    generating, by the server device, respective universal resource locators (URLs) to the respective locations of the resultant images, including encoding associated respective purpose types into the URLs associated with the respective resultant images to provide for querying for the respective resultant images by the associated respective purpose types in the URLs, wherein a first URL of the respective URLs comprises a first purpose type of the set of purpose types, a second URL of the respective URLs comprises a second purpose type of the set of purpose types, and the first purpose type is distinct from the second purpose type, and wherein respective purpose types of the set of purposes types represent different use cases of the images for display in display pages of interfaces, and wherein the respective URLs point directly to the respective locations of the resultant images;
    storing the respective URLs in a data structure;
    receiving a request for the base image from a content delivery network, wherein the request specifies a purpose type;
    querying the respective URLs in the data structure using the purpose type as a parameter of the query to identify a URL matching the purpose type for the base image;
    employing the URL to retrieve a resultant image for the purpose type, and
    transmitting a response to the request including the resultant image.

2. The method of claim 1, wherein the storing the resultant images comprises caching the resultant images at a cache of a content delivery network.

3. The method of claim 1,
    wherein the request further comprises design type information; and further comprising
    processing, by the server device, the resultant image based on the design type information.

4. The method of claim 1, wherein the processing comprises an intelligent cropping process, the intelligent cropping process comprising:
    identifying a face in the resultant image;
    cropping the resultant image without removing the face.

5. The method of claim 1, wherein the processing comprises an intelligent overlay process, the intelligent overlay process comprising:
    overlaying text relative to the resultant image with text color selected to contrast with a background of the resultant image.

6. The method of claim 1, wherein the processing comprises an intelligent overlay process, the intelligent overlay process comprising:
    identifying a face in the resultant image;
    overlaying text relative to the resultant image at a determined location that does not obstruct the face.

7. The method of claim 1, wherein processing the base image into a resultant image of the respective resultant images based upon a purpose type comprises resizing the base image based upon size information.

8. The method of claim 1, wherein the processing comprises an intelligent cropping process, the intelligent cropping process comprising:
    identifying an object in the resultant image;
    cropping the resultant image without removing the object.

9. The method of claim 1, wherein processing the base image into a resultant image of the respective resultant images based upon a purpose type comprises formatting the base image based upon the purpose type into the resultant image having a specified file format type.

10. A system, comprising:
a processor; and
a memory communicatively coupled to the processor, the memory having stored therein computer-executable components, comprising:
an image compositor component configured to:
process a base image into respective resultant images based on distinct defined purposes types of a set of purpose types,
store the resultant images at respective locations,
generate respective universal resource locators (URLs) to the respective locations of the resultant images, including encode associated respective purpose types into the URLs associated with the respective resultant images to provide for querying for the respective resultant images by the associated respective purpose types in the URLs, wherein a first endpoint reference of the respective URLs comprises a first purpose type of the set of purpose types, a second endpoint reference of the respective URLs comprises a second purpose type of the set of purpose types, and the first purpose type is distinct from the second purpose type, and wherein respective purpose types of the set of purposes types represent different use cases of the images for display in display pages of interfaces, and wherein the respective URLs point directly to the respective locations of the resultant images, and
store the respective URLs in a data structure; and
a base image retrieval service component configured to:
receive a request for the base image, wherein the request specifies a purpose type,
query the respective URLs in the data structure using the purpose type as a parameter of the query to identify a URL matching the purpose type for the base image,
employ the URL to retrieve a resultant image for the purpose type, and
return the resultant image in response to the request.

11. The system of claim 10, wherein the request further comprises design type information; and wherein the image compositor component is further configured to modify the resultant image based on the design type information prior to the resultant image being returned in response to the request.

12. The system of claim 11, wherein the image compositor component is further configured to modify the resultant image further based on the design type information using an intelligent cropping process, the intelligent cropping process configured to:
identify a face in the resultant image;
crop the resultant image without removing the face.

13. The system of claim 10, wherein the image compositor component is further configured to modify the resultant image further based on the design type information using an intelligent overlay process, the intelligent overlay process configured to:
identify a face in the resultant image; and
overlay text relative to the resultant at a determined location that does not obstruct the face.

14. The system of claim 10, wherein the set of purpose types comprises at least two of detail, logo, hero, season, series, slideshow, thumbnail, stage, collection, background, tag, home, takeover, image, tile, tile zoom, tile burned in, background burned in, logo padded, or placeholder.

15. A non-transitory machine-readable medium having instructions stored thereon that, in response to execution, cause a processor to perform operations, the operations comprising:
processing a base image into respective resultant images based on distinct defined purposes types of a set of purpose types;
storing the resultant images at respective locations;
generating respective universal resource locators (URLs) to the respective locations of the resultant images the resultant images, including encoding associated respective purpose types into the URLs associated with the respective resultant images to provide for querying for the respective resultant images by the associated respective purpose types in the URLs, wherein a first URL of the respective URLs comprises a first purpose type of the set of purpose types, a second URL of the respective URLs comprises a second purpose type of the set of purpose types, and the first purpose type is distinct from the second purpose type, and wherein respective purpose types of the set of purposes types represent different use cases of the images for display in display pages of interfaces, and wherein the respective URLs point directly to the respective locations of the resultant images;
storing the respective URLs in a data structure;
receiving a request for the base image from a content delivery network, wherein the request specifies a purpose type;
querying the respective URLs in the data structure using the purpose type as a parameter of the query to identify a URL matching the purpose type for the base image;
employing the URL to retrieve a resultant image for the purpose type, and
transmitting a response to the request including the resultant image.

16. The non-transitory machine-readable medium of claim 15, wherein the request further comprises design type information; and
wherein the operations further comprise processing the resultant image based on the design type information.

17. The non-transitory machine-readable medium of claim 16, wherein the processing further comprises:
identifying a face in the resultant image; and
overlaying the text at a determined location and with a determined font that does not obstruct the face.

18. The non-transitory machine-readable medium of claim 15, wherein the processing comprises an intelligent cropping process, the intelligent cropping process comprising:
identifying a face in the resultant image;
cropping the resultant image without removing the face.

19. The non-transitory machine-readable medium of claim 15, wherein the processing comprises an intelligent overlay process, the intelligent overlay process comprising:
overlaying text relative to the resultant image with text color selected to contrast with a background of the resultant image.

20. The non-transitory machine-readable medium of claim 15, wherein processing the base image into a resultant image of the respective resultant images based upon a purpose type comprises resizing the base image based upon size information.

* * * * *